(12) United States Patent
Griffith et al.

(10) Patent No.: US 8,671,990 B2
(45) Date of Patent: Mar. 18, 2014

(54) VACUUM VALVE APPARATUS AND METHOD

(75) Inventors: William W. Griffith, Dublin, VA (US); Ronald Flanary, Blacksburg, VA (US); Jeffrey S. Terrell, Port Matilda, PA (US); Howard Keith Kidd, Christiansburg, VA (US); Kenneth Sowers, Riner, VA (US)

(73) Assignee: Moog Inc., East Aurora, NY (US)

( * ) Notice: Subject to any disclaimer, the term of this patent is extended or adjusted under 35 U.S.C. 154(b) by 492 days.

(21) Appl. No.: 13/027,065

(22) Filed: Feb. 14, 2011

(65) Prior Publication Data

US 2011/0308629 A1 Dec. 22, 2011

Related U.S. Application Data

(60) Provisional application No. 61/304,138, filed on Feb. 12, 2010.

(51) Int. Cl.
*F16K 7/02* (2006.01)

(52) U.S. Cl.
USPC ........... 137/872; 251/9; 251/129.13; 406/182

(58) Field of Classification Search
USPC .............. 251/4–10, 129.11–129.13; 137/872, 137/874, 595, 625.44, 625.46, 625.47; 406/182
See application file for complete search history.

(56) References Cited

U.S. PATENT DOCUMENTS

| 721,743 | A | | 3/1903 | Richmond |
|---|---|---|---|---|
| 2,586,144 | A | | 2/1952 | Benoit |
| 2,624,364 | A | * | 1/1953 | Detlefsen ........................... 251/7 |
| 3,089,502 | A | * | 5/1963 | Davidson et al. .................. 251/6 |
| 3,831,841 | A | | 8/1974 | Franz |
| 3,834,418 | A | | 9/1974 | Clancy |
| 4,253,255 | A | | 3/1981 | Durell |
| 4,305,569 | A | | 12/1981 | Raab et al. |
| 4,397,642 | A | * | 8/1983 | Lamadrid ........................... 251/9 |
| 4,442,865 | A | * | 4/1984 | Shigeo ..................... 137/625.46 |
| 4,473,056 | A | | 9/1984 | Ishida et al. |
| 4,694,861 | A | * | 9/1987 | Goodale et al. ............... 137/595 |
| 4,844,110 | A | | 7/1989 | Paley |
| 5,062,611 | A | | 11/1991 | Hatton |
| 5,113,906 | A | * | 5/1992 | Hogner .......................... 137/595 |
| 5,119,825 | A | * | 6/1992 | Huhn ............................. 137/861 |
| 5,352,214 | A | * | 10/1994 | Oscarsson ......................... 251/9 |
| 5,363,713 | A | | 11/1994 | Pearson |
| 5,402,823 | A | * | 4/1995 | Cole .................................. 251/9 |
| 5,413,566 | A | * | 5/1995 | Sevrain et al. ..................... 251/9 |
| 5,496,270 | A | * | 3/1996 | Nettekoven ..................... 604/30 |
| 5,588,634 | A | * | 12/1996 | Nettekoven ....................... 251/9 |
| 5,819,798 | A | | 10/1998 | Claflin et al. |

(Continued)

FOREIGN PATENT DOCUMENTS

| GB | 290087 | 5/1928 |
|---|---|---|
| JP | 9025662 | 1/1997 |

*Primary Examiner* — John Bastianelli
(74) *Attorney, Agent, or Firm* — Hodgson Russ LLP

(57) ABSTRACT

Embodiments of the invention provide a vacuum valve apparatus and method to provide a vacuum to equipment. The vacuum valve can include an air port tube, a vacuum port tube, a motor, and a control arm coupled to the vacuum port tube and the motor. The motor can cause the control arm to move in an arc in order to flex the vacuum port tube and selectively create the vacuum and vent the vacuum provided to the equipment.

20 Claims, 7 Drawing Sheets

(56) References Cited

U.S. PATENT DOCUMENTS

| | | | |
|---|---|---|---|
| 5,975,514 A | 11/1999 | Emigh et al. | |
| 6,416,295 B1 | 7/2002 | Nagai et al. | |
| 6,460,567 B1 | 10/2002 | Hansen et al. | |
| 6,994,317 B2 | 2/2006 | Fischer | |
| 7,036,794 B2 | 5/2006 | Duelli et al. | |
| 2005/0006489 A1 | 1/2005 | Meyer et al. | |
| 2005/0062212 A1 | 3/2005 | Jensen | |
| 2009/0084997 A1 | 4/2009 | Lee | |

\* cited by examiner

US 8,671,990 B2

VACUUM VALVE APPARATUS AND METHOD

RELATED APPLICATIONS

This application claims priority under 35 U.S.C. §119 to U.S. Provisional Patent Application No. 61/304,138 filed on Feb. 12, 2010, the entire contents of which is incorporated herein by reference.

BACKGROUND

In high speed automation, vacuum valves are capable of building a vacuum and shutting off a vacuum quickly. Many processes are gated by the speed at which this can occur. One example of such an application is vacuum gripper devices used to pick up and move mail, envelopes, and/or paper. Conventional vacuum valves must be replaced frequently due to short life spans.

One type of conventional vacuum valve is a packed spool valve. The spool is generally a cylindrical piece located in the center of the valve that is actuated back and forth by compressed air. Sealing surfaces on the spool, e.g., vulcanized rubber, slide back and forth across a highly polished sleeve, changing the connection paths from input to output as the spool moves.

A conventional packed spool valve is typically designed for air filtered to 40 microns. However, 5 micron filtration is desirable for demanding applications and long valve life. Due to the nature of the application and the very high speed switching of vacuum to vent and corresponding vacuum decay times needed, the incorporation of a filter in order to achieve this level of filtration is neither possible nor practical. Also, the incorporation of a filter to protect the inner workings of the packed spool valve would necessitate a large preventative maintenance operation to change up to 10 separate filters on each machine in a very short replacement cycle. As a result, the internal working components of the packed spool valve are subject to a high degree of particulates of varying size and type, the majority being paper dust, which is very abrasive and also which builds-up inside the valve causing it to leak or otherwise fail due to contamination. The sealing of the packed spool valve is dependent upon the close mating of the vulcanized spool with the inner surface of the sleeve. Conventional packed spool valves last about three to four months in operation before the level of contamination causes them to fail.

SUMMARY

Embodiments of the invention provide a vacuum valve that provides a vacuum to equipment. The vacuum valve can include an air port tube, a vacuum port tube, a motor, and a control arm coupled to the vacuum port tube and the motor. The motor can cause the control arm to move in an arc in order to flex the vacuum port tube and selectively create the vacuum and vent the vacuum provided to the equipment. The motor can be a servo motor than can be controlled in order to tailor a rate of change of the vacuum without substantially slowing down an overall cycle time.

Some embodiments of the invention provide a method for selectively providing a vacuum to equipment. The method can include creating the vacuum provided to the equipment by rotating the control arm to a vacuum position so that the air port tube and the vacuum port tube are aligned relative to each other. The method can further include venting the vacuum provided to the equipment by rotating the control arm to a vent position so that the vacuum port tube is flexed in an arc away from the air port tube.

DETAILED DESCRIPTION

Figure 1:
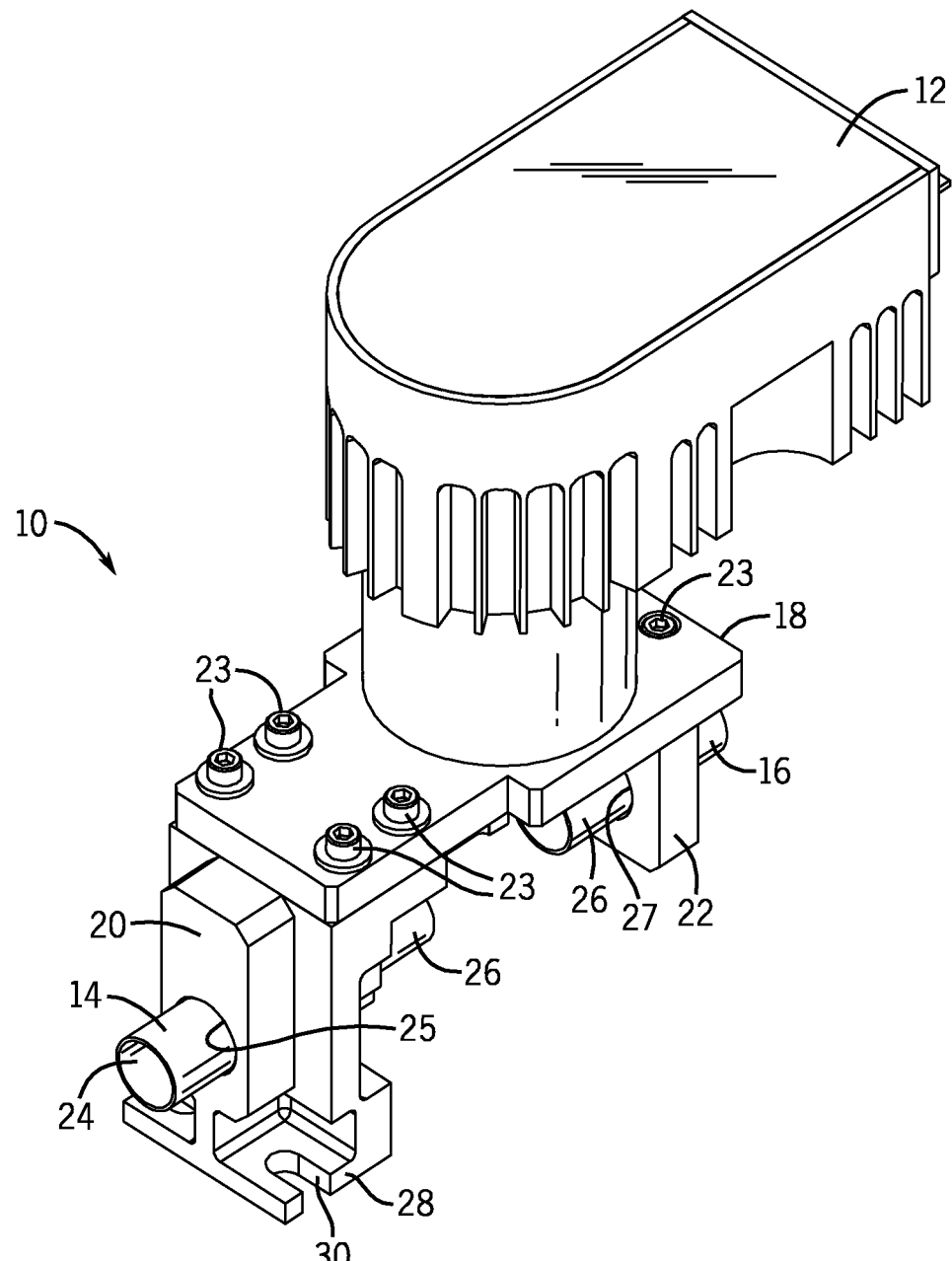
FIG. 1 is a top perspective view of a vacuum valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1-6 illustrate a vacuum valve or "flipper" valve 10 according to one embodiment of the invention. As shown in FIG. 1, the vacuum valve 10 can include a motor 12, an air port 14, a vacuum port 16, a support panel 18, an air port bracket 20, a vacuum port bracket 22, an air port tube 24, and a vacuum port tube 26. The motor 12 is coupled to the support panel 18, which can be a substantially horizontal plate including several apertures, in some embodiments. The motor 12 can be a permanent magnet brushless servo motor or a stepper motor. The air port bracket 20 and the vacuum port bracket 22 can each be coupled to a bottom portion of the support panel 18 by suitable fasteners, such as bolts 23. In one embodiment, the support panel 18, the air port bracket 20, and/or the vacuum port bracket 22 can be machined from an aluminum block. The working surfaces can be precision machined in order to help achieve low-leakage of air and to help prevent the rubbing of parts.

The air port tube 24 can be positioned through an aperture 25 in the air port bracket 20. The air port bracket 20 can include a bottom mounting portion 28 including one or more mounting recesses 30 that can be used to fasten the vacuum valve 10 to other equipment. The vacuum port tube 26 can be positioned through an aperture 27 in the vacuum port bracket 22.

Figure 2:
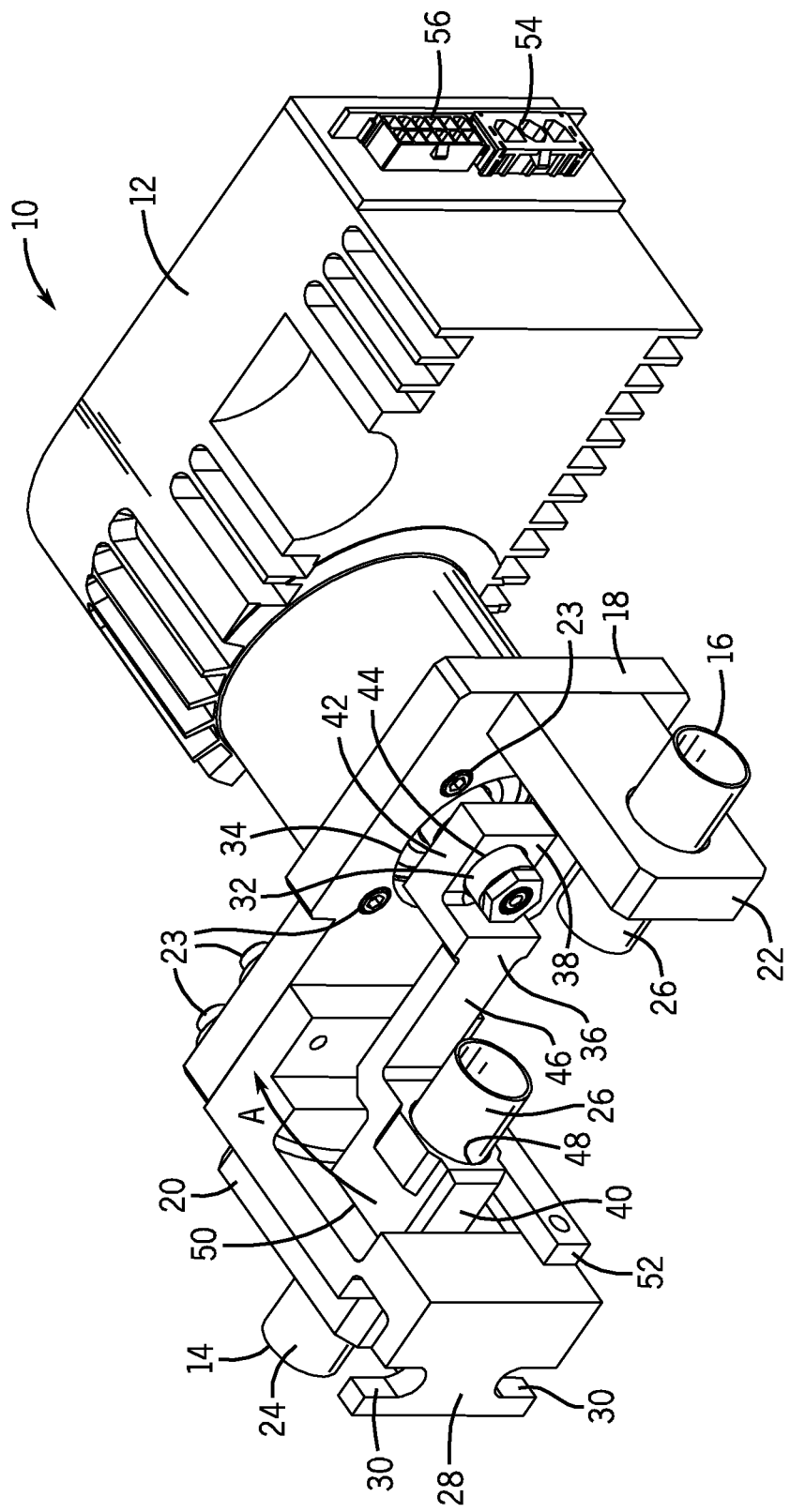
FIG. 2 is a bottom perspective view of the vacuum valve of FIG. 1.
Figure 3:
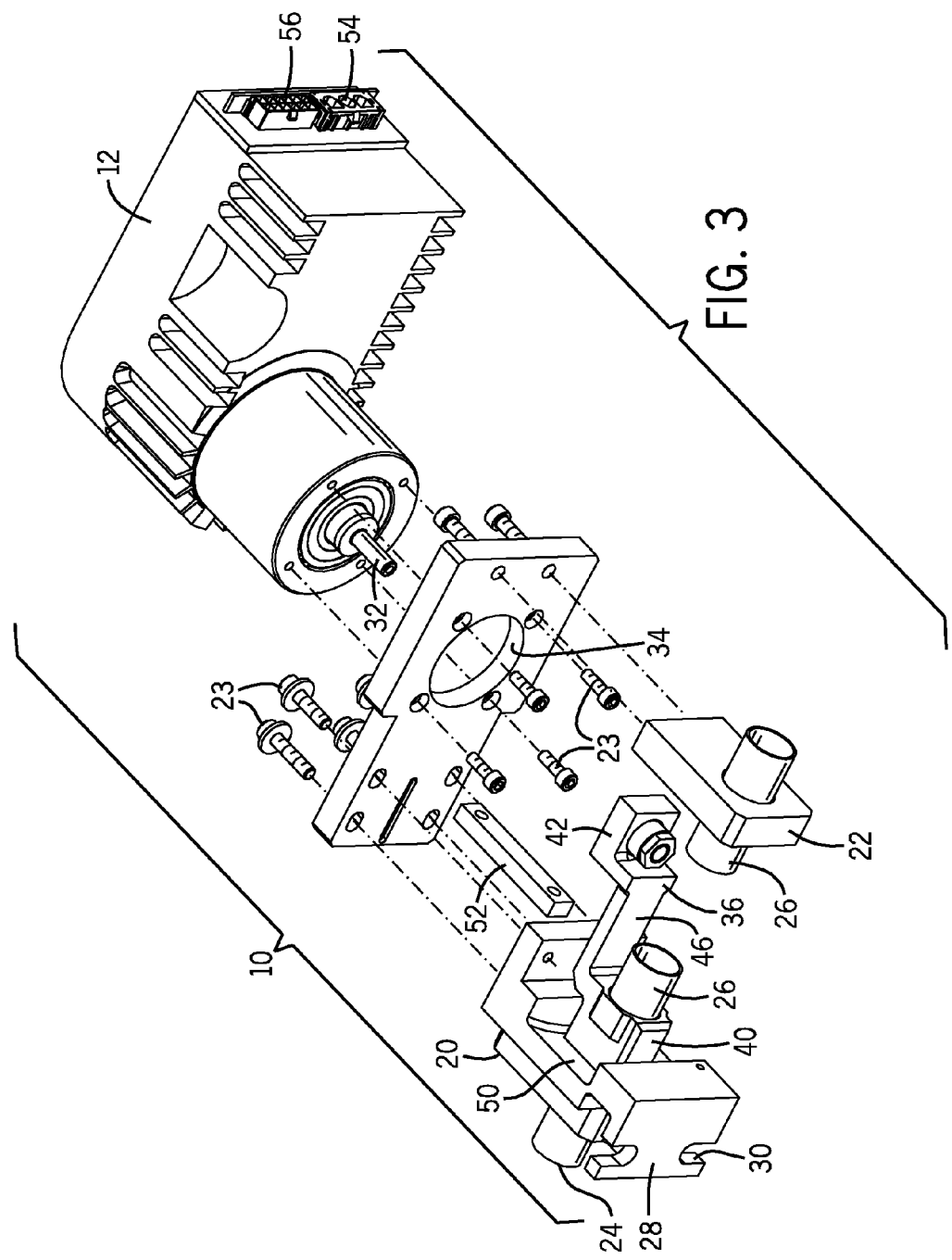
FIG. 3 is an exploded bottom perspective view of the vacuum valve of FIG. 1.
Figure 4:
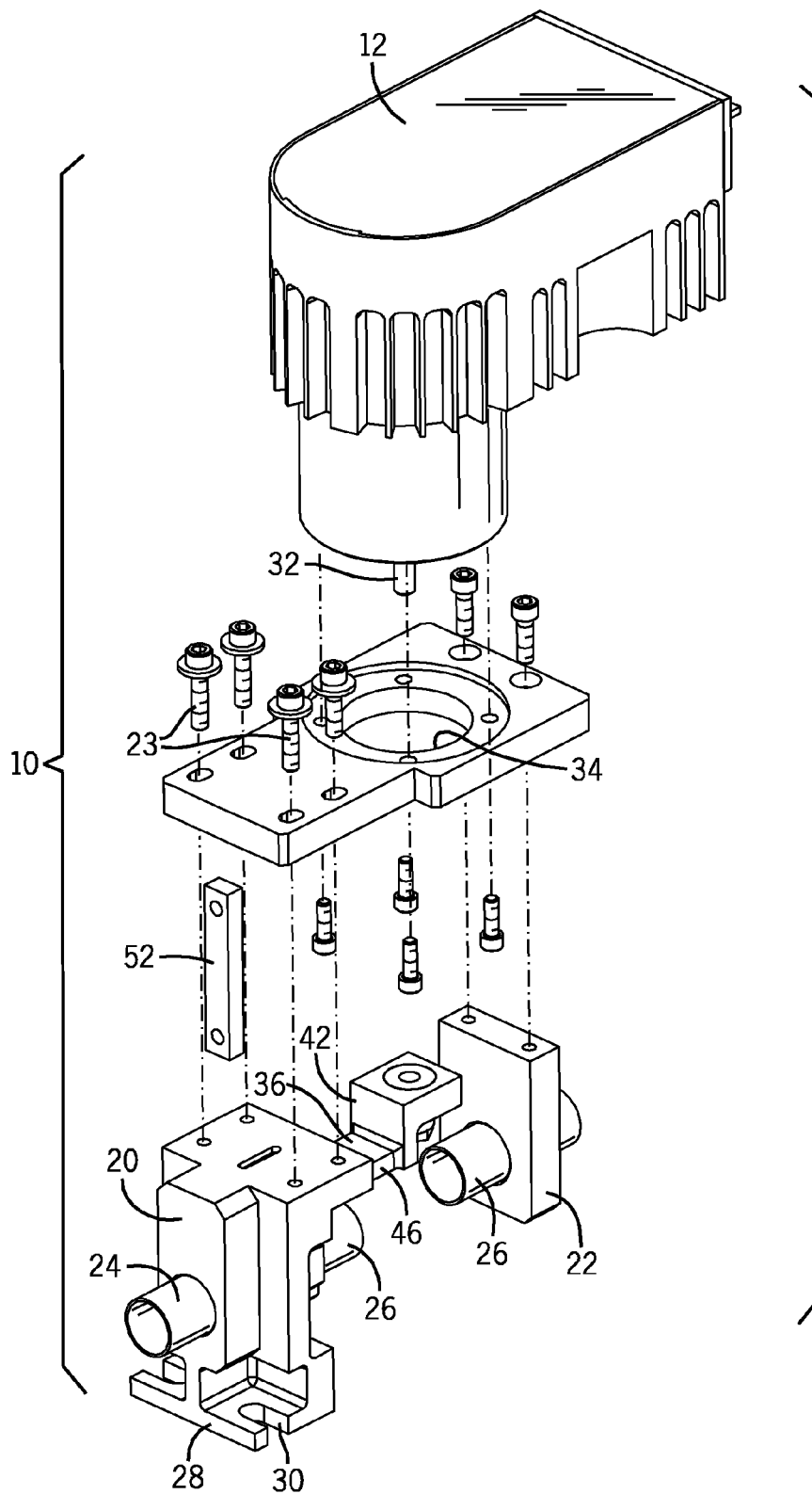
FIG. 4 is an exploded top perspective view of the vacuum valve of FIG. 1.
Figure 5:
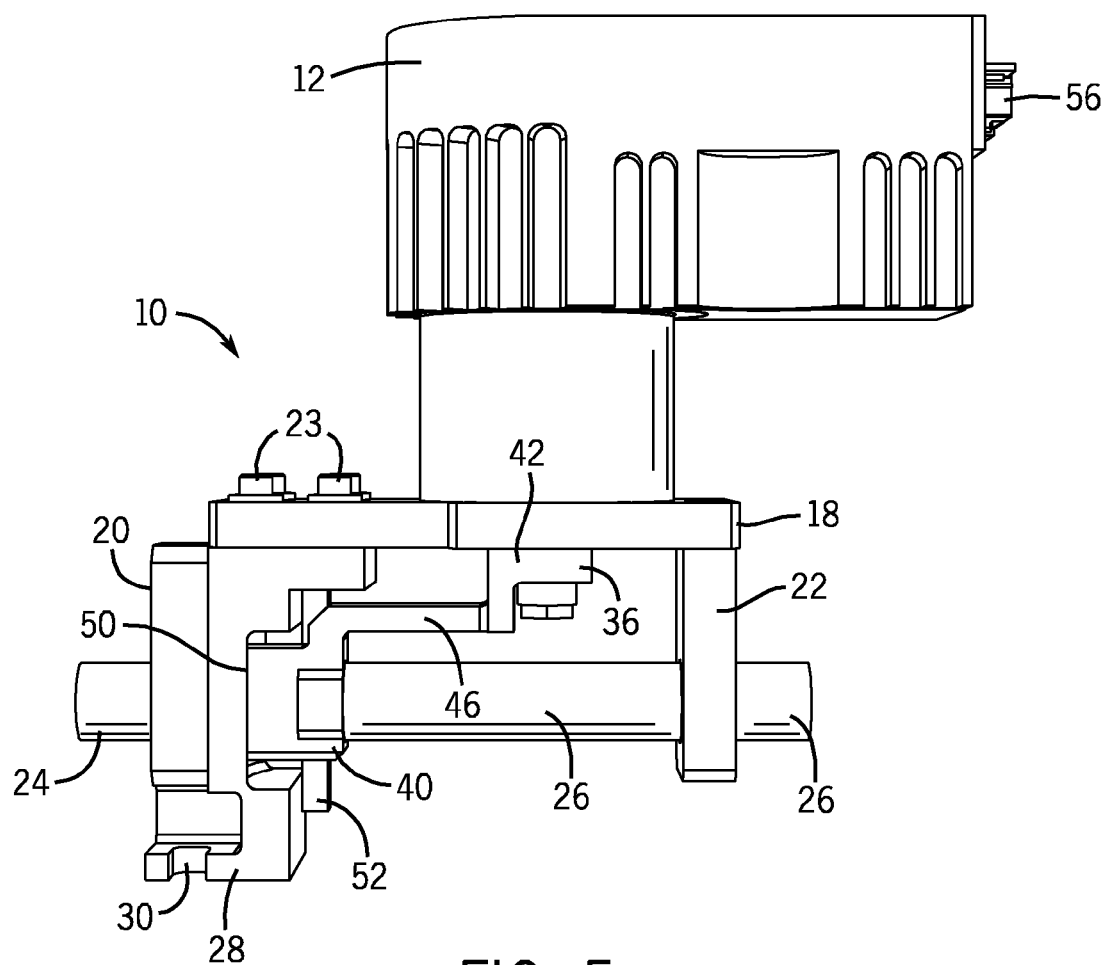
FIG. 5 is a side view of the vacuum valve of FIG. 1.

As shown in FIG. 2, the motor 12 can be coupled to the support panel 18 so that a motor shaft 32 is positioned through an aperture 34 in the support panel 18. The vacuum valve 10 includes a control arm 36 with a first end 38 coupled to the motor shaft 32 and a second end 40 coupled to the vacuum port tube 26. The first end 38 can include a right-angle portion 42 including an aperture 44 through which the motor shaft 32 can be positioned. The first end 38 can be integrally coupled to a beam 46, which can be integrally coupled to the second end 40. The second end 40 can include an aperture 48 through which the vacuum port tube 26 is positioned. Although shown as being broken in FIGS. 1-4 and 6 in order to illustrate the control arm 36, the vacuum port tube 26 is a continuous, unbroken tube between the second end 40 of the control arm 36 and the vacuum port bracket 22, as shown in FIG. 5.

When the control arm 36 is in an open position, as shown in FIG. 2, a vacuum can be created by drawing ambient air from the air port tube 24 to the vacuum port tube 26. The air port tube 24 is coupled to automated pneumatic equipment, such as a vacuum gripper device used to pick up and move mail, envelopes, sheets of paper, etc. The vacuum occurs at the end of the air port tube 24 where it is coupled to the automated pneumatic equipment (i.e., the vacuum is transferred to the "work" at the end of the air port tube 24).

Figure 6:
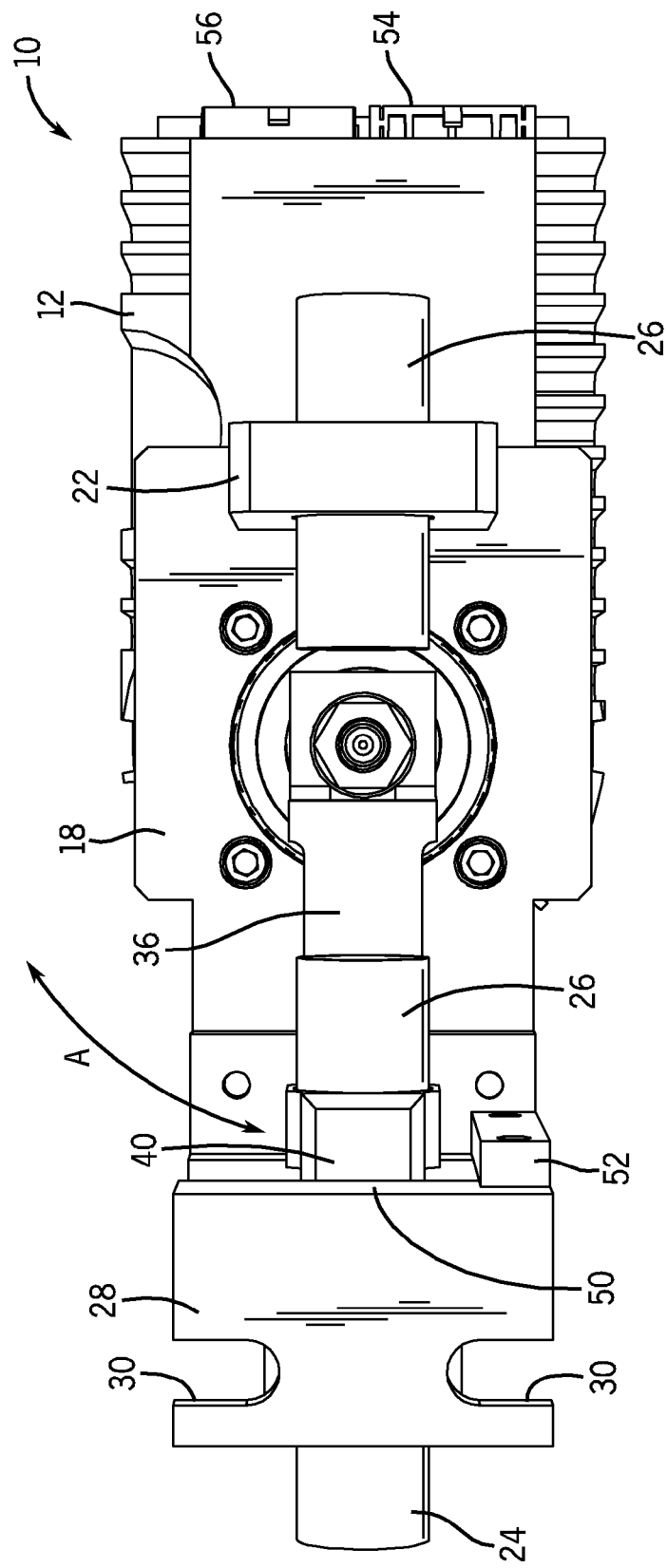
FIG. 6 is bottom view of the vacuum valve of FIG. 1.
Figure 7A:
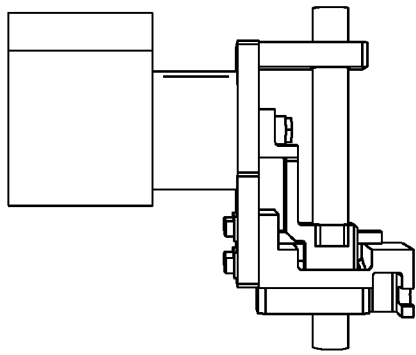
FIGS. 7A-7E are perspective views of vacuum valves according to alternative embodiments of the invention.
Figure 7C:
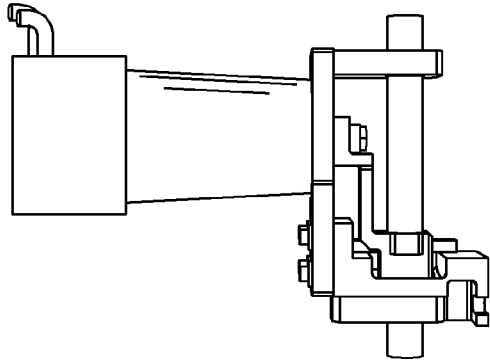
Figure 7B:
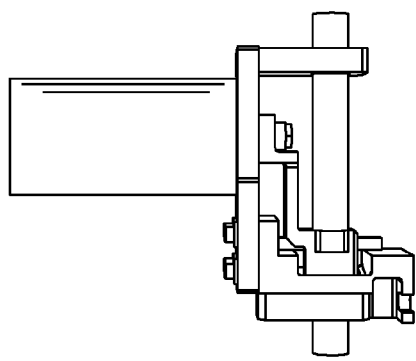
Figure 7D:
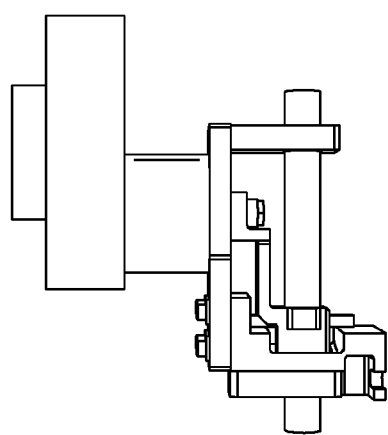
Figure 7E:
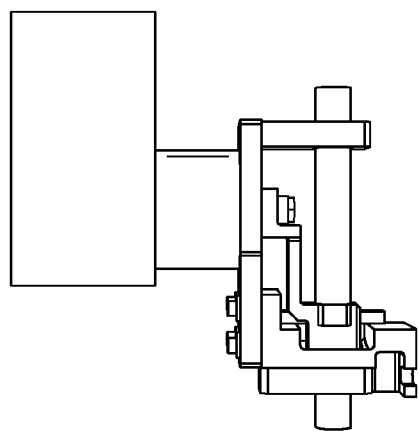

In order to break or vent the vacuum, the control arm 36 can rotate about the motor shaft 32 in order to move in an arc A (as shown in FIGS. 2 and 6) into a closed position (not shown). As the control arm 36 moves in the arc A away from the air port bracket 20, the vacuum port tube 26 flexes. The second end 40 of the control arm 36, and with it the vacuum port tube 26, breaks away from the air port tube 24 at a valve base 50. This allows ambient air into the air port tube 24, breaking the vacuum to the work, and can also place the vacuum port tube 26 over a solid surface, blocking the vacuum at the vacuum port tube 26 for the next cycle.

The control arm 36 of the vacuum valve 10 can move back and forth in the arc A in order to function as a high-speed three-way vacuum control valve. The vacuum valve 10 can be a normally-closed valve that switches its output between vacuum and vent. The positions of the vacuum valve 10 can be initiated on-demand by a machine controller connected to the motor 12. As shown in FIG. 2, the motor 12 can include a power connector 54 and a communication connector 56. The motor 12 can be in electrical communication with a machine controller through the communication connector 56 (e.g., using CAN bus communication or Device Net communication). The motor 12 can include an internal controller that can be in communication with the machine controller. The controller can be positioned within the housing of the motor 12 in order to keep dust and contaminants away from the electronics.

In one embodiment, the overall cycle time of the control arm 36 can average about 167 milliseconds (ms) from a closed position to the next closed position. In one embodiment, movement of the control arm 36 from the open position to the closed position and from the closed position to open position can occur in about ten ms to about twelve ms and can represent about a ten-degree movement of the control arm 36 by the motor 12. In some embodiments, the vacuum valve 10 can include a stop member 52 to help prevent the control arm 36 from rotating beyond the valve base 50.

The control arm 36 is positioned in the vacuum (open) position or the vent (closed) position to alternately supply vacuum or ambient air to the work. In the vent position, the vacuum supply can be blocked. The control arm 36 can move laterally to a closed position to prevent loss of source vacuum. This movement also opens the air port 14 to atmosphere, venting the work.

Referring to FIGS. 2 and 5, the valve base 50 appears to be in close physical contact with a front face of the second end 40 of the control arm 36. In some embodiments, a clearance can exist between the valve base 50 of the air port bracket 20 and the second end 40 of the control arm 36. In some embodiments, the clearance can be adjusted in order to alter the performance of the vacuum valve 10. For example, the clearance can be adjusted in order to prevent undue leakage of vacuum. However, in some embodiments, a small amount of clearance can be desirable for the following reasons: (1) a low leak rate still preserves vacuum level; (2) operating with some clearance eliminates moving parts that are in contact, extending the life of the vacuum valve 10; and (3) a small amount of leakage can create air-flow over the moving parts, which cleans the working surfaces during operation. In some embodiments, the valve base 50 of the air port bracket 20 can be machined very accurately (e.g., about 0.002 of an inch to about 0.004 of an inch of working clearance). A clearance adjustment mechanism can be incorporated into the vacuum valve 10, for example, using the fasteners 23 through the support panel 18.

In some embodiments, the vacuum valve 10 can include one or more of the following characteristics or performance specifications: (1) an effective area of about 244 $mm^2$; (2) a vacuum level of about 500 mbar (−50 kPa) working, 600 mbar (−60 kPa) design; (3) ability to impart a force of about 12.3 Newtons (2.76 pounds) at 500 mbar to the control arm 36 due to vacuum pressure acting on the working area; and (4) ability to overcome rotational inertia of the control arm 36 of about 37 kg $mm^2$.

An additional load on the motor 12 can be due to the weight and stiffness of the flexible vacuum port tube 26. As a result, the vacuum port tube 26 may be light weight to reduce inertia and very flexible to provide for long life and to minimize the moment forces on the control arm 36. In one embodiment, the vacuum port tube 26 is rated for a maximum inlet vacuum of about 600 mbar.

In some embodiments, the on/off response time of the vacuum valve 10 can be about 10 ms to about 12 ms. In some embodiments, it can take about 2 ms after the control arm 36 moves back to the valve base 50 to build up to 95% of full vacuum (i.e., development time). In some embodiments, the vacuum valve 10 has a move-plus-vacuum development time of about 14 ms. In addition, it can take about 2 ms after the control arm 36 moves away from the valve base 50 for the vacuum to adequately decay. In some embodiments, the vacuum off time can be about 14 ms including 2 ms of decay time. The vacuum can be said to be "on" when the vacuum pressure is at 95% of design vacuum (e.g., 500 mbar× 0.95=475 mbar).

In some embodiments, the vacuum valve 10 can have an operating frequency of about 6 Hz on-demand from a machine controller. The operation of the vacuum valve 10 can be initiated by a 24 Volt, direct current ($V_{DC}$) discrete signal from the machine controller. The machine controller can provide two signals: one for open and one for closed. In some embodiments, the vacuum valve 10 can have a design operating frequency of about 33 Hz. In some embodiments, the vacuum valve 10 can have a design life of about 10 operational years or about 1.9 billion cycles.

In some embodiments, it may be desirable to have only one input signal from the machine controller in order to preserve input/output on the machine (e.g., a vacuum gripper). Holding the signal "on" can place the vacuum valve input/output in the open (vacuum) position. When the signal is turned off, the vacuum valve 10 can close (vent). The vacuum valve 10 can spend the majority of time in the closed (vent) position. In one embodiment, the vacuum valve 10 can provide an "enable" signal to the machine controller of 24 $V_{DC}$ PNP.

Lubrication of the vacuum valve 10 working surfaces may generally not be required or be only minimally required. The air port tube 24 and the vacuum port tube 26 can be ¾-inch hoses for a tube-to-tube version of the vacuum valve 10. The vacuum valve 10 can include a ¾-inch vacuum hose supply connection and integrated belt vacuum plenum output for a vacuum-belt version of the vacuum valve 10.

The working components of the vacuum valve 10 (e.g., the moving parts of the control arm, the motor, etc.) are external to the flow, and thus, are not subject to the effects of the contaminants found in the vacuum stream. Since the vacuum is controlled right in the vacuum plenum behind the belt, the vacuum decay times can be much shorter than that of conventional valves that need to be remotely mounted due to their size and configuration. Another benefit of the vacuum valve 10 is that it features a 100% swept flow path. The swept flow prevents build-up of contaminants in the vacuum stream because there are no dead zones that would encourage any build-up.

In some embodiments, the acceleration and deceleration of the control arm 36 can be controlled so that the control arm 36 does not vibrate upon stopping, nor impact the limits of the valve base 50 and create noise and/or deterioration of the working surfaces due to the impact. In these embodiments, the motor 12 can be a permanent magnet brushless servo motor. The servo motor 12 can include an integrated position loop to position the vacuum port tube between two points (e.g., a point A where the vacuum engages and a point B where the vacuum is disengaged). The motion between the vacuum being engaged and the vacuum being disengaged can be accomplished very fast (e.g., less than about 0.012 seconds).

In some applications using conventional vacuum valves, the rate of change from no vacuum to full vacuum is too fast and results is tearing or damaging the part onto which the vacuum was applied. The vacuum valve 10 can have the ability to adjust the speed profile so that the rate of change associated with the vacuum turn-on can be tailored for the specific application. For example, if the control arm 36 moves about ten degrees, the control arm 36 can be slowed down (decelerate) during the last three to four degrees of movement. This can provide an advantage in applications where fragile components (such a letters) are handled. As a result, in some embodiments, the vacuum valve 10 can tailor the rate of change of the vacuum (i.e., of the vacuum turn-on and/or vacuum turn-off) without substantially slowing down the overall cycle of alternate vacuum and venting.

FIGS. 7A-7E illustrate various alternative designs of vacuum valves according to embodiments of the invention.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method for selectively providing a vacuum to equipment, the method including:
   providing a vacuum valve including an air port tube, a vacuum port tube, a motor, and a control arm coupled to the vacuum port tube and the motor;
   creating the vacuum provided to the equipment by rotating the control arm to a vacuum position so that the air port tube and the vacuum port tube are aligned relative to each other; and
   venting the vacuum provided to the equipment by rotating the control arm to a vent position so that the vacuum port tube is flexed in an arc away from the air port tube.

2. The method of claim 1, and further comprising operating the motor to rotate the control arm in the arc from the vacuum position to the vent position in about ten milliseconds to about twelve milliseconds.

3. The method of claim 2, and further comprising decelerating the motor in the last about three to four degrees of the arc as the control arm rotates from the vent position to the vacuum position.

4. The method of claim 2, wherein the motor rotates the control arm in an approximately ten-degree arc.

5. The method of claim 1, and further comprising providing a clearance between the vacuum port tube and the air port tube in the vacuum position.

6. A vacuum valve that provides a vacuum to equipment, the vacuum valve comprising:
   an air port tube;
   a vacuum port tube;
   a motor; and
   a control arm coupled to the vacuum port tube and the motor, the motor causing the control arm to move in an arc in order to flex the vacuum port tube and selectively create the vacuum and vent the vacuum provided to the equipment.

7. The vacuum valve of claim 6, wherein the motor is a servo motor.

8. The vacuum valve of claim 7, wherein the servo motor is controlled in order to tailor a rate of change of the vacuum without substantially slowing down an overall cycle time.

9. The vacuum valve of claim 8, wherein the servo motor is controlled in order to decelerate the control arm as the control arm approaches a valve base.

10. The vacuum valve of claim 9, and further comprising a stop member to prevent the control arm from rotating past the valve base when it approaches the valve base.

11. The vacuum valve of claim 6, wherein when the control arm includes a first end coupled to a shaft of the motor and a second end including an aperture through which the vacuum port tube is positioned.

12. The vacuum valve of claim 6, and further including a support panel, an air port bracket, and a vacuum port bracket, wherein the air port bracket supports the air port tube, the vacuum port bracket supports the vacuum port tube, and the support panel supports at least one of the air port bracket, the vacuum port bracket, and the motor.

13. The vacuum valve of claim 6, wherein the motor causes the control arm to move to a vacuum position in order to create the vacuum provided to the equipment by aligning the vacuum port tube with the air port tube.

14. The vacuum valve of claim 13, wherein the vacuum port tube is positioned relative to the air port tube so that there is a clearance between the vacuum port tube and the air port tube when in the vacuum position.

15. The vacuum valve of claim 14, and further comprising a clearance adjustment mechanism for adjusting the amount of clearance between the vacuum port tube and the air port tube when in the vacuum position.

16. The vacuum valve of claim 6, wherein the motor causes the control arm to move to a vent position in order to vent the vacuum provided to the equipment by flexing the vacuum port tube away from the air port tube and allowing ambient air into the air port tube.

17. The vacuum valve of claim 6, wherein the arc is about an approximately ten-degree arc.

18. The vacuum valve of claim 17, wherein the motor causes the control arm to move the full ten-degree arc within about 10 milliseconds to about 12 milliseconds.

19. The vacuum valve of claim 6, wherein the vacuum port tube provides a 100% swept flow path of the vacuum to the equipment.

20. The vacuum valve of claim 6, wherein the motor and the control arm are positioned external from a vacuum stream through the vacuum port tube.

* * * * *